J. H. MORELAND.
DUST GUARD FOR BEARINGS.
APPLICATION FILED JAN. 8, 1917.

1,258,600.

Patented Mar. 5, 1918.
4 SHEETS—SHEET 2.

WITNESS
F. J. Hartman

INVENTOR
John H. Moreland
BY
Fenton & Blount
ATTORNEYS

J. H. MORELAND.
DUST GUARD FOR BEARINGS.
APPLICATION FILED JAN. 8, 1917.

1,258,600.

Patented Mar. 5, 1918.
4 SHEETS—SHEET 3.

WITNESS
F. J. Haitmann.

INVENTOR
John H. Moreland
BY
Fenton & Blount
ATTORNEYS

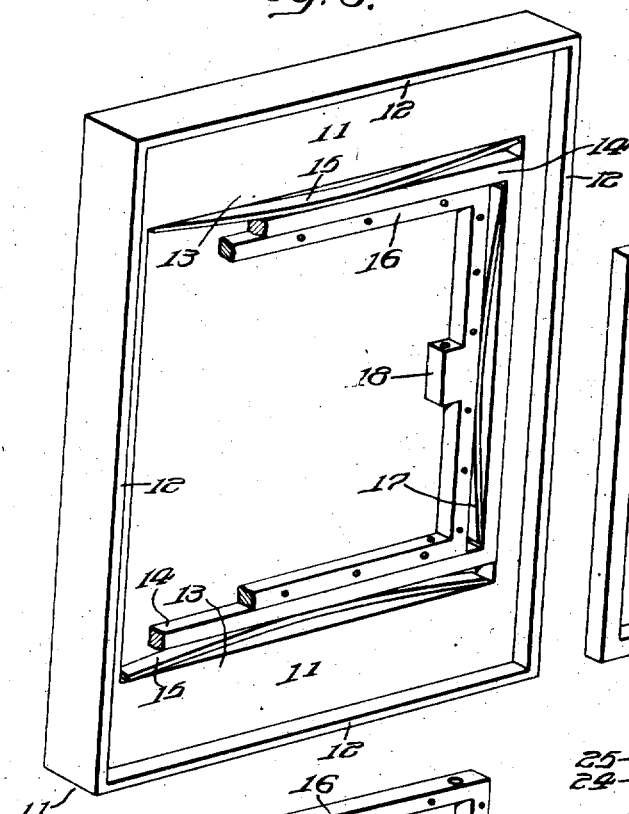
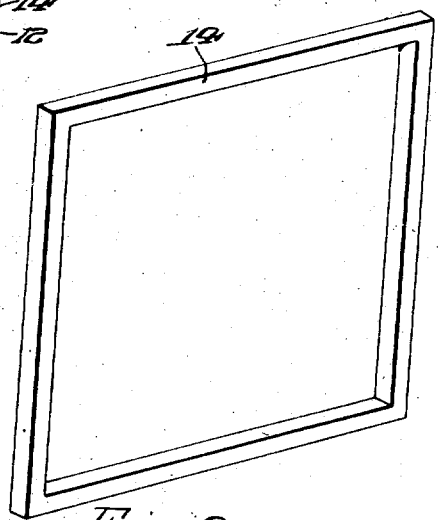
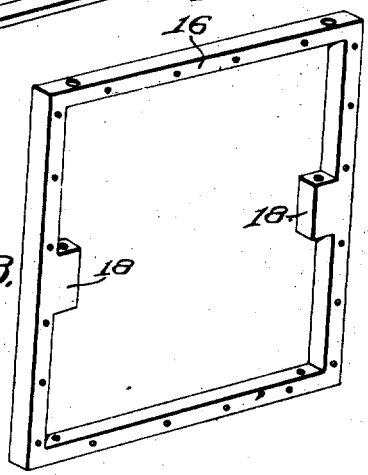
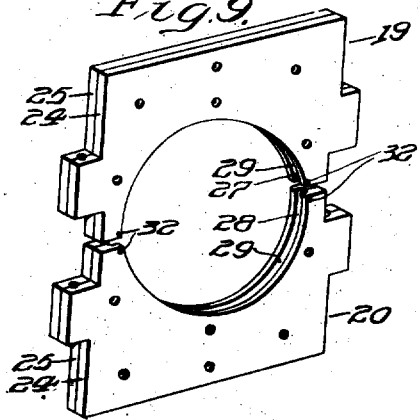

UNITED STATES PATENT OFFICE.

JOHN H. MORELAND, OF ALTOONA, PENNSYLVANIA.

DUST-GUARD FOR BEARINGS.

1,258,600.  Specification of Letters Patent.  Patented Mar. 5, 1918.

Original application filed April 25, 1911, Serial No. 623,218. Divided and this application filed January 8, 1917. Serial No. 141,143.

*To all whom it may concern:*

Be it known that I, JOHN H. MORELAND, a citizen of the United States, and a resident of Altoona, in the county of Blair and State of Pennsylvania, have invented certain new and useful Improvements in Dust-Guards for Bearings, whereof the following is a specification, reference being had to the accompanying drawings.

This invention relates to dust guards for journal bearings and is a division of my co-pending application Serial No. 623,218, filed April 25, 1911, for anti-friction bearings.

The objects of the present invention are to provide an arrangement of dust guards for bearings in which an improved dust guard is provided with means for automatically compensating for wear between the rotating member of the bearing and the dust guard; to provide anti-friction means between the dust guard and shaft, and to provide a dust guard free to yield in all directions independently of its supporting frame to prevent buckling or distortion of any of the parts as a shaft or axle may move in an eccentric path relative to the support. In this manner the guard is always maintained in operative engagement with the shaft of the bearing and thus at all times efficiently prevents dust from entering the bearing or its associated parts.

Further objects of this invention are to provide a dust guard having a frame relatively fixed with respect to the relatively stationary bearing member and having a plate surrounding the shaft or journal and movable in accordance with any displacement of the axis thereof. This invention also has for its object to provide said dust guards with separate split plates disposed upon opposite sides of the shaft, each having a semi-circular recess embracing said shaft, and provided with undercut ball races whose over-hanging edges prevent displacement of said balls when the dust guard members are removed from the shaft.

This invention also includes various detailed arrangements of construction hereinafter more specifically defined.

Figure 1:
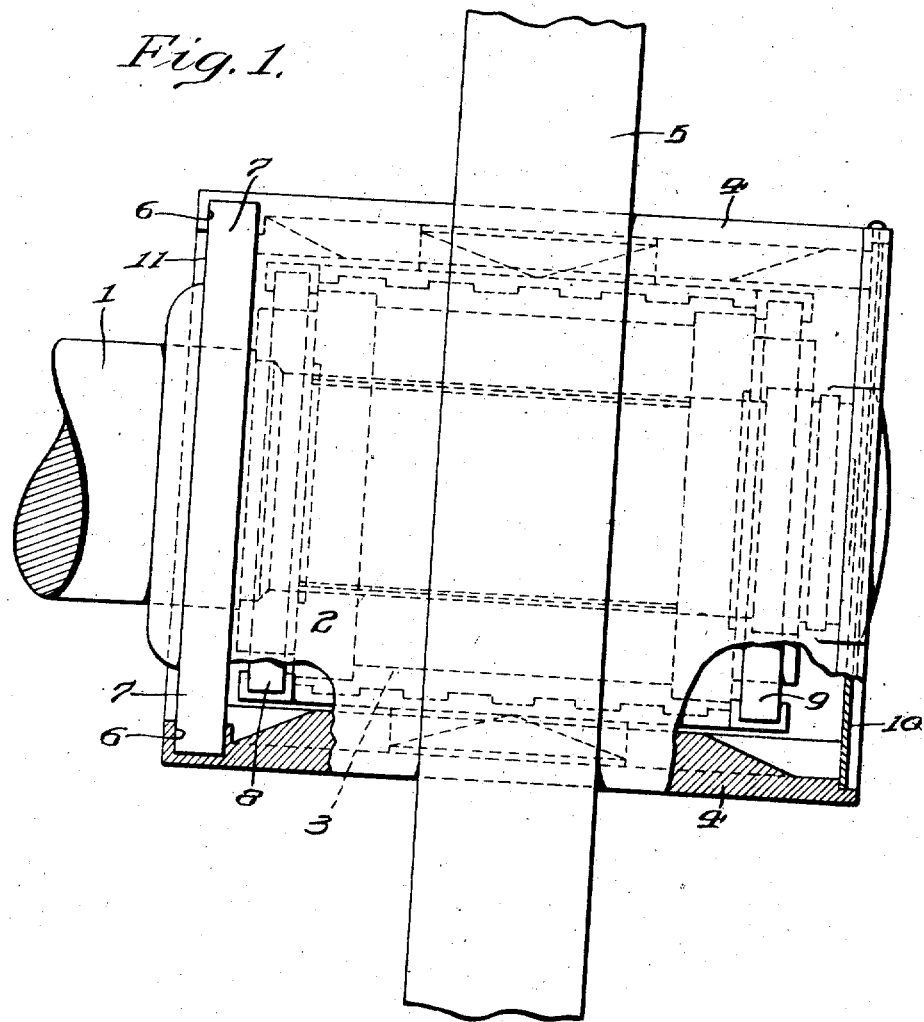
Figure 2:
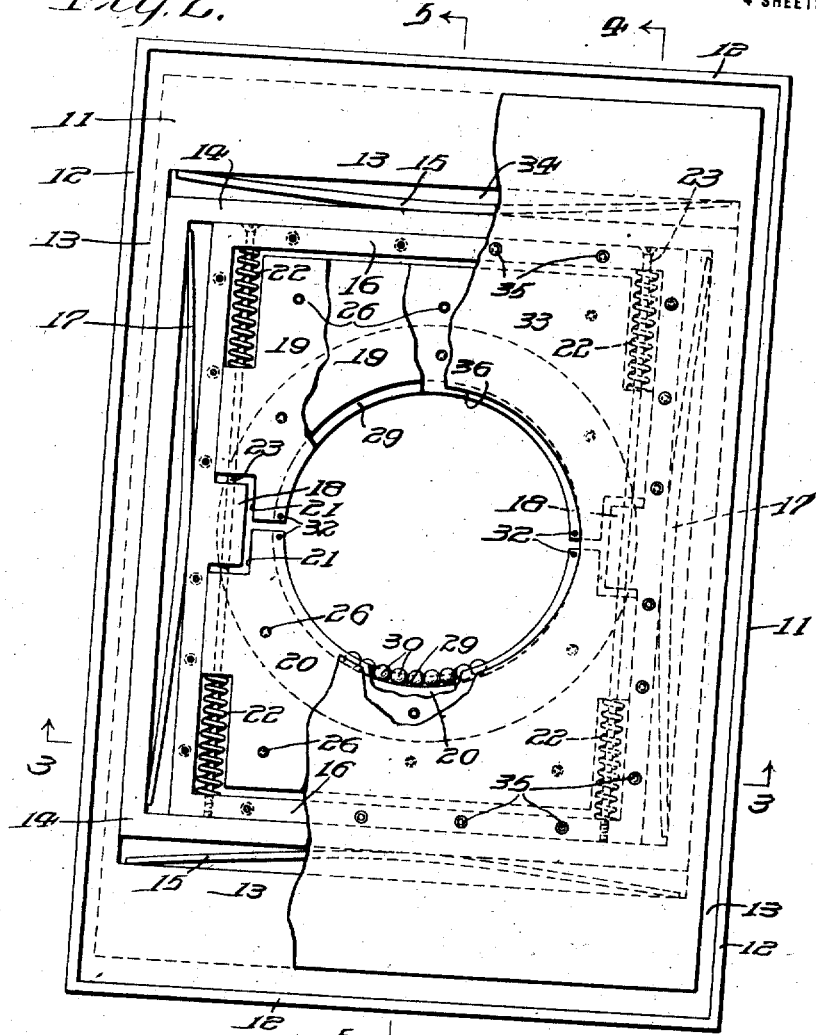
Figure 3:
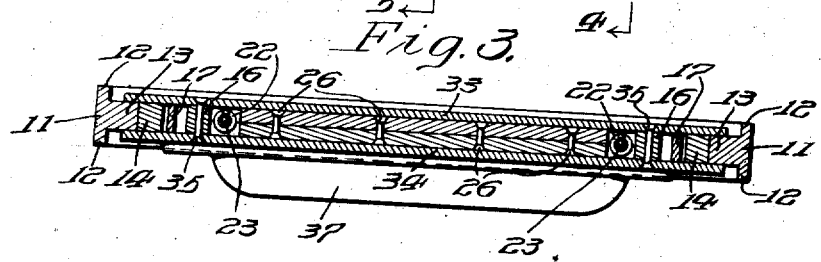
Figure 4:
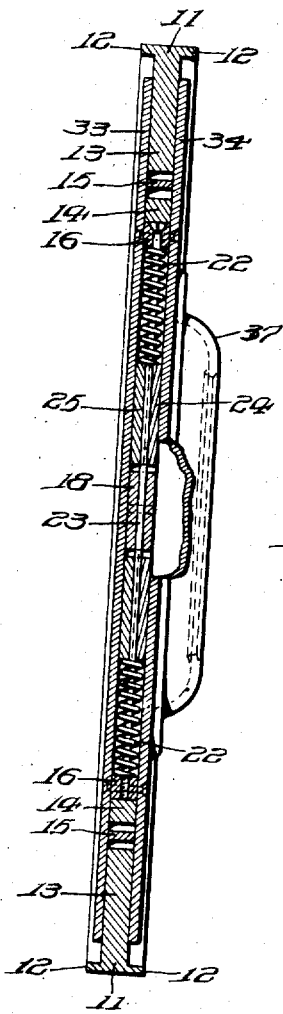
Figure 5:
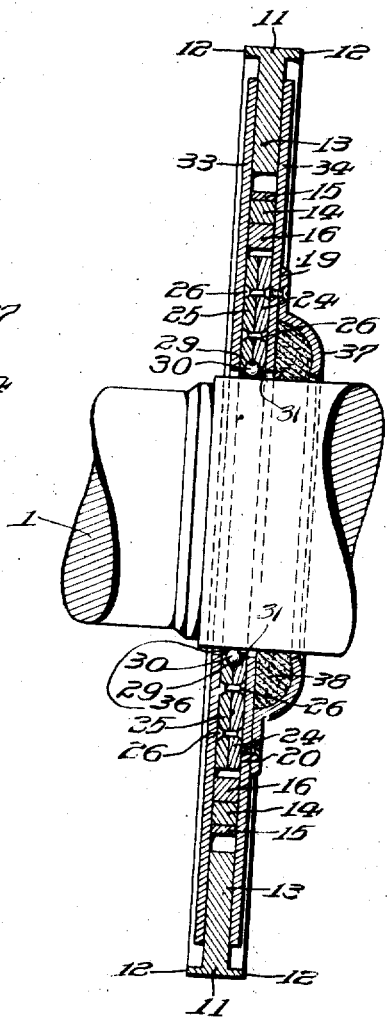

In the accompanying drawings, Figure 1 is a plan view of a bearing provided with my improved form of dust guard; Fig. 2 is an elevational view of the dust guard, parts being broken away to more clearly show the construction; Fig. 3 is a section on a line 3—3 of Fig. 2; Fig. 4 is a section on a line 4—4 of Fig. 2; Fig. 5 is a section taken on the line 5—5 of Fig. 2; Fig. 6 is a perspective view of the supporting frames of my improved dust guard; Figs. 7 and 8 respectively are perspective views of the intermediate and inner frames and Fig. 9 is a perspective view of the dust guard plates which engage the rotating shaft of the bearing.

Referring to the drawings, in Fig. 1 is shown a journal bearing having my improved dust guards applied thereto, wherein 1 represents the axle or shaft, 2 the journal and 3 the roller bearing which may be of any construction but as shown indicates the form of bearing claimed in my co-pending application above referred to of which this is a division, 4 represents a casing surrounding the bearing, and 5 a car truck frame or other device which is to be supported thereby. The casing 4 is provided with grooves 6 which form convenient means for supporting my improved dust guard 7. Additional dust guards, generally of a similar construction, numbered 8 and 9, may be located within the journal bearing casing. The casing 4 is provided with a hinged end closure 10 whereby access to the bearing may be had.

Referring now to Figs. 2 to 9 inclusive, wherein the specific form of dust guard 7 is illustrated, 11 represents the outer rectangular frame which is located in the groove 6 of the casing 4. The frame 11 is provided with marginal flanges 12 adapted to engage the grooves 6 to hold said frame in the casing. The frame 11 has an inwardly extending tongue 13 within which is mounted an intermediate relatively movable rectangular frame 14 having its opposite vertical side bars in slidable engagement with the frame 11 and normally maintained centrally therein by flat springs 15 disposed between said outer frame and intermediate frame at the top and bottom thereof.

Within the intermediate frame 14 is disposed an inner rectangular frame 16, which has its top and bottom bars in slidable engagement with the top and bottom bars of the intermediate frame 14, and is normally maintained in central position within frame 14 by the flat springs 17 disposed between the side bars of the intermediate frame 14 and the inner frame 16, and the side bars of the inner frame are each provided with inwardly extending lugs 18, for the purpose of retaining suitable dust guard plates.

A pair of relatively movable sliding dust guard members or plates 19 and 20 are mounted to slide vertically in the inner frame 16, and have lateral edges in slidable engagement with the vertical side bars of said inner frame 14, said plates 19 and 20 being provided at their inner adjacent corners with recesses 21 adapted to receive the lugs 18 of the inner frame. Said plates are further provided at their outer corners, with recesses for the springs 22 which tend to shift the plates 19 and 20 constantly toward each other into engagement with the shaft 1 with which they engage.

Said springs 22 are held in effective position by means of bolts 23 which extend through the top and bottom bars of the inner frame 16 and through the margins of the plates 19 and 20 and the lugs 18, and are in threaded engagement with the lower bar of the frame 16, as clearly shown in Fig. 2.

The plates 19 and 20 constitute a dust guard element proper and are preferably formed, as shown in Fig. 9, of separate flat sheet metal plates 24 and 25 secured together by rivets 26, and have opposed semicircular recesses 27 and 28 to form a circular aperture through which the axle 1 extends. Each of said plates 19 and 20 has an undercut ball race 29, which is formed by grooving the inner adjacent faces of the semi-circular edges of the respective plates 24 and 25, so that when the plates are riveted together the balls 30 are held therein by engagement of the over-hanging edges 31 thus formed.

Each of the plates 19 and 20 has an aperture 32 extending through said plates at the opposite ends of their respective ball races (see Figs. 9 and 2) for the insertion of a pin or other suitable implement, to prevent the escape of the balls 30 when the plates 19 and 20 are removed from the frame 18.

The relatively movable dust guard members or plates 19 and 20, the inner frame 18, and intermediate frame 14 are inclosed by the side plates 33 and 34 which are carried by the inner frame 14, being secured thereto by rivets 35 as clearly shown in Fig. 3. When the dust guard plates and frames are disposed within the outer frame 11 the marginal edges of the plates 33 and 34 engage on opposite faces of the marginal tongue 13 of the frame 11 and thus retain the dust guard in position relatively to the outer frame. A marginal space surrounds the perimeter of the outer plates 33 and 34 to permit the movement of these plates relatively to the outer frame 11, so that the dust guard with the plates may move with the axle 1 in an eccentric path without buckling or in any way distorting the side plates 33 and 34.

The plates 33 and 34 are provided with apertures 36 adapted to receive the shaft 1, and the outer plate 34 is provided with a pocket 37 surrounding the axle 1 and adapted to carry suitable oiled packing 38 to further prevent the entrance of dust into the casing 4. The inner margin of the plate 34 prevents the oil from the packing 38 from escaping down into the dust guard frame but permits the same to be supplied to the ball race.

As the dust guards 8 and 9 are substantially similar in construction to the dust guard 7 which has been described in detail it is deemed unnecessary to specifically set forth the construction of these additional dust guards.

The operation of the improved device will be readily understood from the description of its construction. The plates 19 and 20 are constantly maintained in engagement with the rotating member of the bearing and the springs 22 take up any relative wear between the parts. The yieldingly supported double frame construction comprising the inner frame 16 and the intermediate frame 14 affords a dust guard support which will permit the dust guard member proper to shift in any lateral direction with the axle 1. The construction of the inner dust guard members 19 and 20, by reason of the ball race 29, forms a comparatively simple construction for retaining the balls 30 and also forms an anti-friction engagement between the dust guard and the rotating member of the bearing.

Although only one embodiment of my invention has been herein described, it is not desired to limit this invention to the specific details of construction and arrangement set forth as it is obvious that various modifications may be made without departing from the essential features of the invention as defined in the appended claims.

Having described my invention I claim:

1. In a dust guard for journal bearings, the combination of relatively movable dust guard members adapted to surround the rotating member of the bearing, and means for yieldingly maintaining said movable members as a unit in operative engagement with said member, so as to permit said unit to move in all directions in a plane passing through said unit.

2. In a dust guard for journal bearings, the combination of a pair of relatively movable dust guard members adapted to engage the rotating member of the bearing and provided with anti-friction means for engagement therewith, and means for yieldingly maintaining said members in operative engagement with said rotating member.

3. In a dust guard for journal bearings, the combination of a pair of relatively movable dust guard members adapted to surround the journal and provided with automatically operating wear compensating means and means for yieldingly supporting said members so as to permit eccentric movement of the shaft and members relative to said supporting means.

4. In a dust guard for journal bearings, the combination of a pair of relatively movable dust guard members adapted to surround the journal and provided with automatically operating wear compensating means, anti-friction means carried by said members for engagement with said journal, and means for yieldingly supporting said members so as to permit eccentric movement of the journal and members relative to said supporting means.

5. In a dust guard for journal bearings, the combination of a pair of relatively movable plates adapted to surround the journal and provided with springs arranged to move said plates toward each other to compensate for wear between the plates and the journal, said plates being provided with anti-friction balls for engagement with the journal, and means for yieldingly supporting said plates to permit the shaft and plates to move in an eccentric path relative to said supporting means.

6. In a dust guard for journal bearings, opposed plates adapted to engage the rotary member of the bearing and respectively having undercut grooves surrounding said member, and balls disposed in said grooves and retained therein by the opposed over-hanging edges of said plates.

7. In a dust guard for bearings, dust guard members having an aperture arranged to receive the rotary member of the bearing and comprising a central wall having an undercut groove, balls disposed in said groove and surrounding said rotary member, a frame for said central wall, and yielding means in said frame arranged to permit the relative movement of said wall and frame.

8. A dust guard for bearings formed of relatively movable plates disposed on the opposite sides of the axle of said bearing and having a ball race surrounding said aperture and provided with undercut edges arranged to retain balls therein.

9. A dust guard comprising relatively movable plates disposed upon opposite sides of a shaft and having ball races surrounding said shaft with undercut edges arranged to retain the balls in said races and yielding means operative to retain said plates in engagement with said shaft.

10. An anti-friction bearing in a dust guard comprising a frame, relatively movable plates mounted in said frame and provided with ball races embracing the movable member of a bearing, and having undercut edges arranged to retain balls therein when the plates are removed from the bearing.

11. A dust guard for bearings comprising an outer frame in fixed relation with the bearing, an intermediate frame movable in said outer frame in one direction, an inner frame movable in said intermediate frame in a direction transverse to the movement of said intermediate frame, relatively movable plates mounted in said inner frame and having an aperture for the movable member of said bearing, and a ball race surrounding said aperture, and provided with undercut edges operative to retain balls therein.

12. A dust guard for bearings comprising an outer frame mounted in stationary relation with said bearings, an intermediate frame movable in said outer frame and yieldingly maintained centrally therein, an inner frame movable in said intermediate frame and yieldingly maintained centrally therein, relatively movable plates mounted in said inner frame and having opposed semi-circular recesses provided with undercut ball races arranged to retain a series of balls surrounding the rotary member of said bearing, and yielding means tending to force said balls toward said member.

13. A dust guard comprising an outer frame, an intermediate frame movable in said outer frame, an inner frame movable in said intermediate frame and relatively movable plates arranged to be disposed upon opposite sides of the rotary member of a bearing, means arranged to yieldingly maintain said frames and plates in operative position and to permit an eccentric movement of said plates, and outer plates embracing said first-mentioned plates and secured to the inner frame.

14. A dust guard for journal bearings comprising an outer frame, an intermediate frame movable in said outer frame, an inner frame movable in said intermediate frame, and relatively movable plates arranged to be disposed on opposite sides of a rotating member in said bearing, means arranged to yieldingly maintain said frames and plates in operative position and to permit an eccentric movement of said plates and outer plates disposed on opposite sides of said first-mentioned plates secured to said inner frame, one of said outer plates being provided with a pocket arranged to maintain packing surrounding said rotating member.

15. In a dust guard for journal bearings, a frame for yieldingly supporting a pair of opposed plates, inwardly extending lugs on said frame, said plates having recesses for the reception of said lugs and a second set of recesses to form a space for the location of springs adapted to move said plates toward each other, and bolts for retaining said springs in position and passing through the plates and lugs and secured to said frame.

16. In a dust guard for bearings, a frame for securing said dust guard in position on said bearing, an inwardly extending marginal tongue on said frame, a pair of opposed plates adapted to engage a rotary member in said bearing and provided with means coöperating with said tongue to maintain said plates in operative position.

17. In a dust guard for bearings, a frame for securing said dust guard in position on said bearing, an inwardly extending marginal tongue on said frame, a frame yieldingly supported between the opposite faces of said tongue, a dust guard supported by said inner frame and engaging a rotary member in said bearing, and plates connected to said frame and overlapping said tongue and dust guard member adapted to maintain the yieldingly supported frame and member in said outer frame.

18. In a dust guard for journal bearings, a dust guard member engaging a rotary bearing member and comprising a pair of plates juxtaposed in face to face relationship, each of said plates provided with opposed undercut grooves in the edges which are adapted to engage the rotating member, forming a ball race retaining anti-friction balls therein.

19. In a dust guard for journal bearings, the combination of a support and a dust guard element adapted to surround a journal in the bearing and provided with anti-friction means between the engaging edge of the dust guard element and the journal.

20. In a dust guard for journal bearings, the combination of a dust guard element adapted to surround a journal in the bearing, means to automatically compensate for the wear between said journal and the dust guard element and means for yieldingly supporting said members so as to permit eccentric movement of the shaft and members relative to said supporting means.

21. In a dust guard for journal bearings, the combination of a supporting frame, a dust guard element adapted to surround a journal in the bearing within said frame, means to yieldingly maintain said dust guard element in operative position in said frame to permit said element to move in all directions in the plane of said element and outer protecting plates extending over said frame and dust guard element to cover the joint between the same.

22. A dust guard for bearings comprising an outer frame in fixed relation with the bearing, an intermediate frame movable in said outer frame in one direction, an inner frame movable in said intermediate frame in a direction transverse to that of the movement of said intermediate frame and relatively movable plates mounted in said inner frame and having an aperture for the rotatable member of the bearing.

In witness whereof, I have hereunto set my hand this 6th day of January, A. D. 1917.

JOHN H. MORELAND.